Patented Feb. 23, 1954

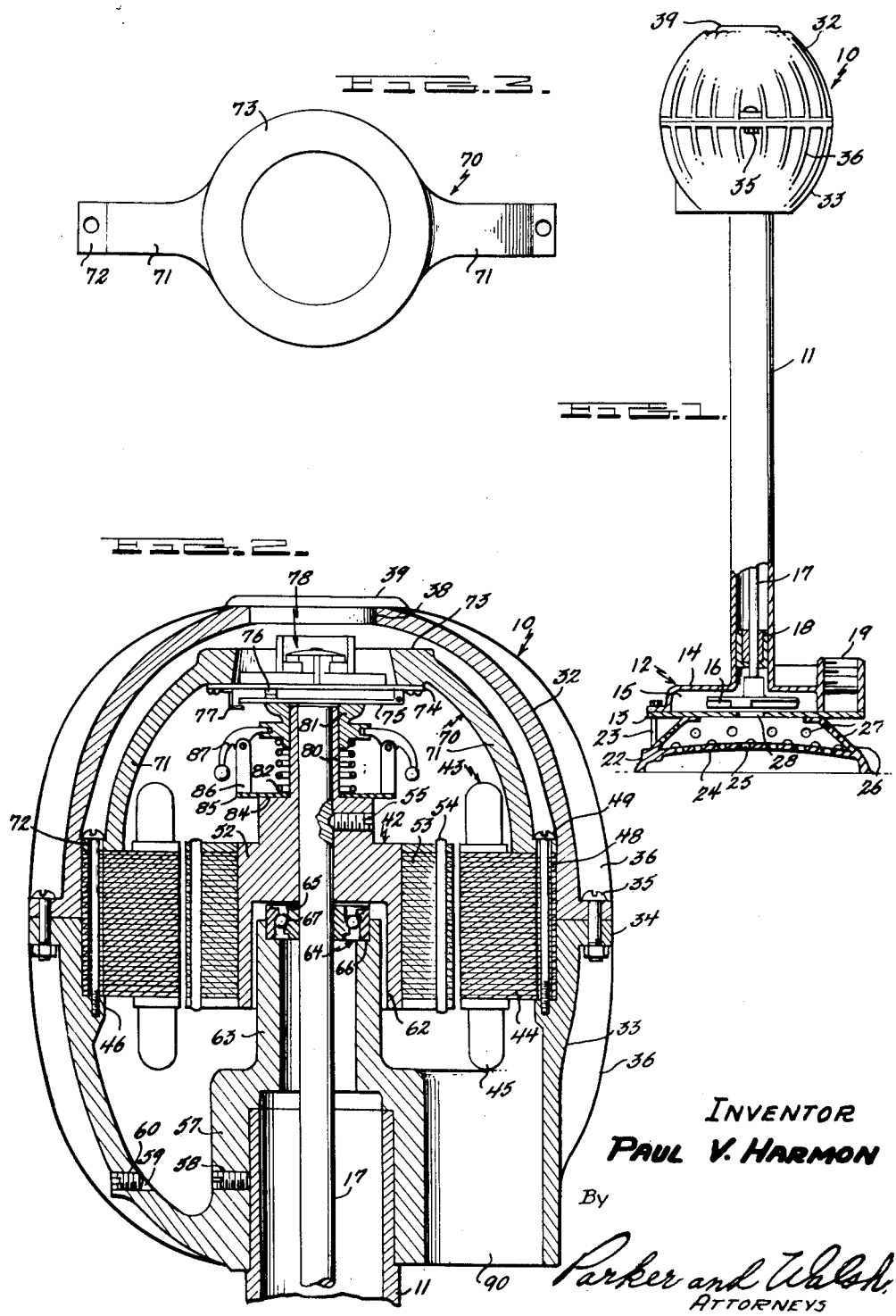

2,670,447

UNITED STATES PATENT OFFICE 2,670,447

ELECTRIC MOTOR INSTALLATION

Paul V. Harmon, Nashville, Tenn., assignor to Precision Parts Corporation, Nashville, Tenn., a corporation of Tennessee Application May 26, 1950, Serial No. 164,489

6 Claims. (Cl. 310—66)

1

This invention relates to an electric motor installation, and more particularly to a motor and the mounting means therefor.

An important object of the invention is to provide a novel electric motor mounting, particularly for use in operating sump pumps, wherein the motor is mounted in a novel manner within a protective housing.

A further object is to provide such a construction including means for mounting within the housing certain control units for the motor, the assembly of elements being such as to greatly facilitate the assembly of the parts and the accessibility thereof for servicing, etc.

A further object is to provide a motor mounting of the character referred to wherein highly simplified means are provided for fixing within a protective housing an electric motor and certain control elements therefor.

A further object is to provide such a structure wherein a single set of fastening elements secures in the housing the stator of the motor and the control elements for the motor, such as an overload switch, a starter winding switch, etc.

A further object is to provide a construction of the character referred to wherein the stator of the motor and the control elements therefor may be completely assembled outside the housing and placed within the housing substantially as a unit, and wherein a section of the housing may be removed for ready access to the control units of the motor.

Other objects and advantages of the present invention will become apparent during the course of the following description.

In the drawing, I have shown one embodiment of the invention. In this showing,

Figure 1 is a side elevation of a sump pump construction embodying the invention, parts being shown in section, Figure 2 is an enlarged vertical sectional view taken axially through the motor and its housing, looking in the opposite direction from Figure 1, parts being shown in elevation, and Figure 3 is a plan view of a supporting yoke employed for supporting certain control units for the motor.

Referring to Figure 1, the numeral 10 designates the motor housing as a whole which will be further described below together with the motor housed therein. The housing 10 is supported in a manner to be described on the upper end of a tubular standard 11. In the present instance, the motor structure is shown as being adapted for driving a sump pump, and this pump comprises a housing indicated as a whole by the numeral 12. This housing is formed of a lower plate 13 and an upper housing section 14 fixed to or formed integral with the tubular standard 11. The housing members 13 and 14 form a pump chamber 15 in which is arranged a pump shown in the present instance as a centrifugal impeller 16 connected to the lower end of a shaft 17 arranged in the tubular standard 11. This shaft is supported above the impeller 16 in a bearing 18 preferably of the self-oiling type, for example oil impregnated bronze. The pump is provided with an outlet 19 which may be suitably connected with a take-off pipe.

The pump housing 12 is supported on a base 22, and the housing members 13 and 14 are fixed to each other and connected to the base by bolts 23. The base 22 has a bottom wall 24 perforated as at 25, and also includes a frustoconical side wall 26 perforated as at 27. The pump structure described usually is arranged in a sump immersed in the liquid therein, and this liquid flows through the strainer openings 25 and 27 into the base 22 and thence upwardly through an opening 28 into the pump chamber 15.

The housing 10 comprises upper and lower complementary sections 32 and 33 respectively, having their adjacent edges provided with outstanding contacting flanges 34 secured together by bolts 35. The casing sections 32 and 33 are preferably provided with fins 36 to dissipate heat generated by the motor. It will become apparent that no opening is necessary in the housing 10 because of the accessibility of the parts, but if desired, the casing section 32 may be provided with an axial opening 38, normally capped as at 39 for purposes of inspecting certain of the parts to be referred to.

Within the housing 10 is arranged a motor comprising rotor and stator elements indicated as a whole respectively by the numerals 42 and 43. The stator unit 43 comprises laminations 44 which are conventional except as described below, and the stator is provided with the usual windings 45. The laminations rest upon an annular shoulder 46 preferably formed integral with the lower casing section 33. The laminations are drilled as at 48 to receive screws 49 tapped into the shoulder 46 to fix the motor stator in position and also to secure in position a supporting yoke described in detail below.

The rotor unit 42 comprses a hub 52, preferably of cast aluminum, carrying the usual laminations 53 and windings 54. The hub 52 surrounds the upper end of the shaft 17 and is fixed thereto by a set screw 55. The housing section 33 is provided in the bottom thereof with a preferably integral upwardly extending sleeve 57 in which the upper end of the tubular column 11 is received to support the motor and its housing in position. A set screw 58 fixes the column 11 in position and the housing 33 is provided with an opening 59 normally plugged as at 60 and provided as access for drilling and tapping the opening in which the set screw 58 is threaded. The hub 52 is provided with an axial recess 62 into which extends the reduced upper end 63 of the sleeve 57. A combined radial and thrust bearing 64 is arranged between the sleeve portion 63 and the shaft 17.

The bearing comprises an inner race 65 fixed to the shaft 17, an outer race 66 fixed to the sleeve portion 63, and ball bearings 67 arranged between two races. A preferably unitary shaft 17 is employed, supported solely by the two bearings 18 and 64. This arrangement of parts forms per se no part of the present invention but is described and claimed in my co-pending application, Serial No. 164,490, filed May 26, 1950.

The motor is provided within the housing with certain control elements which may be conventional and in themselves form no part of the present invention. One of the important features of the present invention, however, is the supporting of control elements for the motor in such a way as to facilitate the assembling of the apparatus and to provide ready accessibility to the various parts. To this end, an arcuate yoke 70 is arranged within the housing section 32 and is provided with opposite downwardly curved arms 71 each terminating in an apertured foot 72 through which extends one of the screws 49, it being necessary to employ only two such screws at diametrically opposite points as shown in Figure 2. The yoke is provided with a central circular portion 73 carrying therebeneath a plate 74 associated with a switch 75 normally closing a circuit through a contact 76 carried by the plate 74. Downward movement of the switch 75 is limited by a stop 77. This switch, closed when the motor is not operating, is for the purpose of closing a circuit through the starting winding of the motor, such motor, of course, being conventional, and this takes place upon the closing of a suitable main switch to be referred to later. The plate 74 also carries an overload switch indicated as a whole by the numeral 78. This switch also is conventional and need not be illustrated or described in detail.

The hub 52 is provided with an upward axially extending sleeve portion 80 forming a bearing for a crosshead 81 normally urged upwardly by a spring 82. At the lower end of the sleeve portion 80 is formed a shoulder 84 on which the lower end of the spring 82 seats, and a plate 85 is supported on the shoulder 84. This shoulder is shown as being provided with upstanding ears 86 to which are pivotally connected governor weight arms 87 engaging and controlling the crosshead 81 to move the switch 75 to open position after the motor has started and has accelerated to a predetermined speed. At such time, the running winding of the motor will be energized.

The present device is particularly intended for use in conjunction with a sump pump. Such a pump has its motor usually controlled automatically by a float which closes a switch to operate the motor when the liquid level in the sump rises to a predetermined point, the float opening the switch when the liquid level has been pumped down to a lower point. The float and the switch controlled thereby form no part of the present invention and accordingly have not been illustrated. The casing section 33 is provided with an opening 90 (Figure 2) in which the main control switch for the motor is adapted to be arranged.

*Operation*

In assembling the apparatus, the stator 43, yoke 70 and the elements carried thereby will be assembled outside the casing and placed as a unit in the casing. Because of the accessibility of the parts, the stator 43 may be first placed in the casing, followed by the insertion of the yoke and the attaching of the screws. Of course, it is assumed that the rotor 42 and its associated elements will have been in place, and the placing of the yoke and the elements carried thereby will complete the assembly so that the cover or casing section 32 may be applied and secured in place.

The functioning per se of the various control elements associated with the rotor and the yoke 70 may be conventional. Assuming that the device uses the control elements described, the motor will be started by the closing of the switch housed in the opening 90 and the switch 75 being closed, the starting winding of the motor will be energized. As soon as the motor picks up speed to a predetermined point, the governor weight arms 87 will move outwardly to depress the crosshead 81 and open the switch 75, whereupon the running windings of the motor will be energized.

The invention is shown in the present instance for driving a sump pump, but it is not limited in its application to such use. Assuming that the sump pump is employed, the pump will operate until the liquid level is lowered to the predetermined point, whereupon the float mechanism (not shown) will stop the motor. The parts will return to the normal position, the spring 82 moving the crosshead 81 upwardly to close the switch 75, ready for the next operation. The overload switch 78 functions conventionally.

If any of the control parts require inspection, repair or replacement, they are readily accessible. The overload switch may be inspected by removing the cap 39. If further access to the parts is required, the bolts 35 may be removed and the cover 32 lifted from the motor, thus exposing all of the control parts above the motor. It will be apparent that the removing of the casing section does not disturb any of the functioning parts and these may be inspected while the motor is running.

If it is necessary to repair or replace any of the parts, the screws 49 may be unscrewed from the shoulder 46, whereupon the yoke 70 may be lifted out to repair or replace any parts of the switch 75 or overload switch 78. The governor parts 81 and 87, together with the plate 85, may be lifted directly from the sleeve 80 for inspection or repair. The stator 43 may be lifted out with equal ease. If necessary to inspect the rotor 42, or any of the governor parts connected thereto, it merely is necessary to loosen the screw 55 whereupon these parts may be lifted as a unit from the apparatus.

Thus it will be apparent that the present construction provides a highly novel arrangement of parts which facilitates the initial assembling of the parts when the apparatus is manufactured. Likewise, the construction provides a high degree of accessibility to any of the parts in the housing. The bearing 64 may be packed in grease, and requires no attention over a period of several months. From time to time, the rotor may be lifted in the manner described to supply fresh lubricant to the bearing 64. The set screw 55 preferably is recessed into the shaft so that when tightened, the rotor hub 42 will be supported out of direct contact with the bearing 64, as shown in Figure 2. Accordingly, the weight of the rotor will be carried by the shaft wholly independently of direct contact with the bearing 64, the inner and outer races of which respectively solely engage the shaft 17 and sleeve portion 63.

I claim:

1. An electric motor installation comprising an electric motor having a stator and a rotor, a casing for said motor comprising complementary casing sections divided transverse to the axis of the motor and substantially midway of the height of said stator, one of said sections having an internal shoulder on which said stator rests, said shoulder projecting inwardly and said casing sections below the plane of division thereof substantially fitting said stator, a single yoke in the upper of said casing sections provided at its lower ends with outstanding feet resting on said stator, switch means carried by said yoke, and common fastening elements passing through said feet, through said stator and directly into said shoulders to fix said yoke and said stator directly on said shoulder.

2. An electric motor installation comprising an electric motor having a stator and a rotor, a casing for said motor comprising complementary sections divided in a horizontal plane substantially transverse to the axis of said motor, one of said casing sections having an inwardly projecting annular shoulder on which said stator seats, an axial hub carried by said rotor and provided with an upward axial extension, a single yoke in the upper of said casing sections having horizontal outstanding feet at the lower ends thereof seating on said stator, fastening elements passing through said feet, through said stator and into said shoulder to directly secure said stator in position on said shoulder and to secure said yoke directly to said rotor, a switch device carried by said yoke axially thereof, and a governor device carried by the upward axial extension of said hub and controlling said switch means.

3. An electric motor installation comprising an electric motor having a stator and a rotor, a casing for said motor comprising complementary sections divided in a horizontal plane substantially transverse to the axis of said motor, one of said casing sections having an inwardly projecting annular shoulder on which said stator seats, an axial hub carried by said rotor and provided with an upward axial extension, a single yoke in the upper of said casing sections having horizontal outstanding feet at the lower ends thereof seating on said stator, fastening elements passing through said feet, through said stator and into said shoulder to directly secure said stator in position on said shoulder and to secure said yoke directly to said stator, a switch device carried by said yoke axially thereof, a governor device carried by the upward axial extension of said hub and controlling said switch means, a shaft for said motor projecting through said hub and through the upward axial extension thereof, said lower casing section having an upward axial extension surrounding said shaft and projecting within said hub, a radial and thrust bearing carried by the last-named portion of said lower section and supporting said shaft, and means for fixing said hub to said shaft against rotational and vertical movement relative to said shaft out of engagement with said bearing.

4. An electric motor installation comprising an electric motor having a stator and a rotor, a casing for said motor comprising complementary casing sections divided in a plane substantially transverse to the axis of said motor intermediate the height of said stator, said casing sections in said plane having contacting faces fitting each other and said casing sections being secured together, one of said casing sections having an internal annular shoulder below said plane and on which said stator rests, the interior of said casing sections above and below said plane surrounding and fitting said stator, a control device for said motor, a single supporting means for said control device, said supporting means having horizontal portions resting directly on said motor stator, and screws passing through said horizontal portions, through said motor stator and into said shoulder to fix said supporting means with respect to said stator and to fix said stator in position on said shoulder.

5. An electric motor installation comprising an electric motor having a starter and a rotor, a casing for said motor comprising complementary casing sections divided in a plane substantially transverse to the axis of said motor intermediate the height of said stator, said casing sections in said plane having contacting faces fitting each other and said casing sections being secured together, one of said casing sections having an internal annular shoulder below said plane and on which said stator rests, the interior of said casing sections above and below said plane surrounding and fitting said stator, a single yoke mounted in the other casing section, a control device for said motor carried by said yoke, said yoke having ends directly engaging said stator member, and means for securing the ends of said yoke to said stator member and for directly securing said stator member to and against said shoulder.

6. An electric motor installation comprising an electric motor having a stator and a rotor, a casing for said motor comprising complementary casing sections divided in a plane substantially transverse to the axis of said motor intermediate the height of said stator, said casing sections in said plane having contacting faces fitting each other and said casing sections being secured together, one of said casing sections having an internal annular shoulder below said plane and on which said stator rests, the interior of said casing sections above and below said plane surrounding and fitting said stator, a single yoke mounted in the other casing section, a control device for said motor carried by said yoke, said yoke having outstanding ends seating directly on the side of said stator opposite said shoulder, and fastening elements passing through said ends, through said stator and into said shoulder to serve as common means for securing said yoke to said stator member and for securing said stator member to said shoulder.

PAUL V. HARMON.

References Cited in the file of this patent

UNITED STATES PATENTS

| Number | Name | Date |
|---|---|---|
| 834,899 | Freeman | Nov. 6, 1906 |
| 1,012,198 | Goughnour | Dec. 19, 1911 |
| 1,249,526 | Shelton | Dec. 11, 1917 |
| 1,424,164 | Hoover | Aug. 1, 1922 |
| 1,530,724 | Hollander | Mar. 24, 1925 |
| 1,772,778 | Magnuson | Aug. 12, 1930 |
| 1,843,315 | Blish et al. | Feb. 2, 1932 |
| 2,176,118 | Brinda | Oct. 17, 1939 |
| 2,309,583 | Frantz | Jan. 26, 1943 |
| 2,346,778 | Mitchell | Apr. 18, 1944 |
| 2,452,807 | Thompson | Nov. 2, 1948 |

FOREIGN PATENTS

| Number | Country | Date |
|---|---|---|
| 19,395 | Great Britain | Dec. 11, 1913 |